US012779644B2

(12) United States Patent
Teramoto et al.

(10) Patent No.: US 12,779,644 B2
(45) Date of Patent: Nov. 3, 2026

(54) DRIVING TOOL

(71) Applicant: MAKITA CORPORATION, Anjo (JP)

(72) Inventors: Makito Teramoto, Anjo (JP); Kiyonobu Yoshikane, Anjo (JP); Tatsuya Ikedo, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 19/327,813

(22) Filed: Sep. 12, 2025

(65) Prior Publication Data

US 2026/0084276 A1 Mar. 26, 2026

(30) Foreign Application Priority Data

Sep. 24, 2024 (JP) ................................ 2024-164931

(51) Int. Cl.

| | |
|---|---|
| ***B25C 1/00*** | (2006.01) |
| ***B25C 1/04*** | (2006.01) |
| ***B25C 1/06*** | (2006.01) |

(52) U.S. Cl.

CPC ............. *B25C 1/008* (2013.01); *B25C 1/047* (2013.01); *B25C 1/06* (2013.01)

(58) Field of Classification Search

CPC ........... B25C 1/008; B25C 1/047; B25C 1/06

See application file for complete search history.

(56) References Cited

U.S. PATENT DOCUMENTS 5,025,676 A * 6/1991 Perretta .................. B41F 31/04 74/89.42

5,052,871 A * 10/1991 Collins .................. F16B 33/02 411/436

FOREIGN PATENT DOCUMENTS

JP 7107650 B2 7/2022

* cited by examiner

*Primary Examiner* — Michelle Lopez

(74) *Attorney, Agent, or Firm* — Oliff PLC

(57) ABSTRACT

A driving tool has a contact arm and a connection member. The position of the contact arm can be adjusted in a front-rear direction by rotating the connection member via an adjustment mechanism. The adjustment mechanism has a male screw and a female screw, with a radial clearance between them. The size of the radial clearance, which is the distance between the crest diameter of the male screw and the root diameter of the female screw, is between 4% and 10% of the root diameter.

20 Claims, 9 Drawing Sheets

DRIVING TOOL

CROSS-REFERENCE TO RELATED APPLICATION

This application claims priority to Japanese patent application serial number 2024-164931, filed on Sep. 24, 2024, the contents of which are incorporated herein by reference in their entirety for all purposes.

TECHNICAL FIELD

The present invention generally relates to a driving tool for driving a driving member, such as a nail or staple, into a workpiece such as wood or other materials.

BACKGROUND

Driving tools are known which are designed to drive fasteners, such as nails or staples, and eject them from an ejection port. Generally, such a driving tool has a contact arm that is located in front of the ejection port and movable in a rearward direction. A rear portion of the contact arm is connected to a connection member that is movable in a front-rear direction relative to a tool main body of the driving tool. When a driving operation is performed, the contact arm is pressed against the workpiece to move the contact arm in the rearward direction relative to the tool main body. A trigger on the tool main body is then pulled. When both the contact arm and the trigger are operated, the driving member is driven from the ejection port of the driving tool.

For example, a driving tool with an adjustment mechanism for adjusting a position of the contact arm in the front-rear direction relative to the ejection port is well known. The adjustment mechanism has a female screw formed on the contact arm and a male screw formed on the shaft of the connection member. The connection member has a dial that can be rotated by a user. By rotating the dial, the shaft rotates together with the dial, and the contact arm moves in the front-rear direction relative to the shaft. Because of this configuration, the position of the contact arm is adjustable in the front-rear direction and accordingly a driving depth of the driving member driven into the workpiece is adjustable.

In the above configuration, for example, as shown in FIG. 9, the user rotates a dial 101 while pushing it toward the tool main body 100. This causes the dial 101 and the shaft 102 to tilt toward the tool main body 100. As a result, a contact arm 103 is pushed by the shaft 102 and accordingly the contact arm 103 is tilted relative to the shaft 102. This causes the male screw 104 and female screw 105 to be cross-threaded, which increases an operating force on the dial 101. This may deteriorate operability of the dial 101.

SUMMARY OF THE DISCLOSURES

Thus, there is a need for a driving tool that is less likely to deteriorate the operability of the dial and other components.

Current disclosure relates to a driving tool that is equipped with a contact arm that protrudes forward from an ejection port. A rear portion of the contact arm is connected to a connection member. An adjustment mechanism, which screws (secures) the contact arm's rear portion to the connection member, allows for the adjustment of the contact arm's position in the front-rear direction by rotating the connection member. The adjustment mechanism has a male screw and a female screw, with a radial clearance between them. The male screw is formed on either the contact arm or the connection member, while the female screw is formed on the other. The radial clearance is defined as a difference between the crest diameter of the male screw and the root diameter of the female screw, and its size is specified to be 4% to 10% of the root diameter. The crest diameter is the length of the diameter that connects the crests of the male threads in the radial direction. The root diameter is the length of the diameter that connects the bottoms of the valleys of the female threads in the radial direction. The radial clearance permits a slight "rattling" of the adjustment mechanism, which reduces the likelihood of cross-threading and deterioration of the connection member's operability, even if the screws are misaligned or tilted.

DETAILED DESCRIPTION

Figure 1:
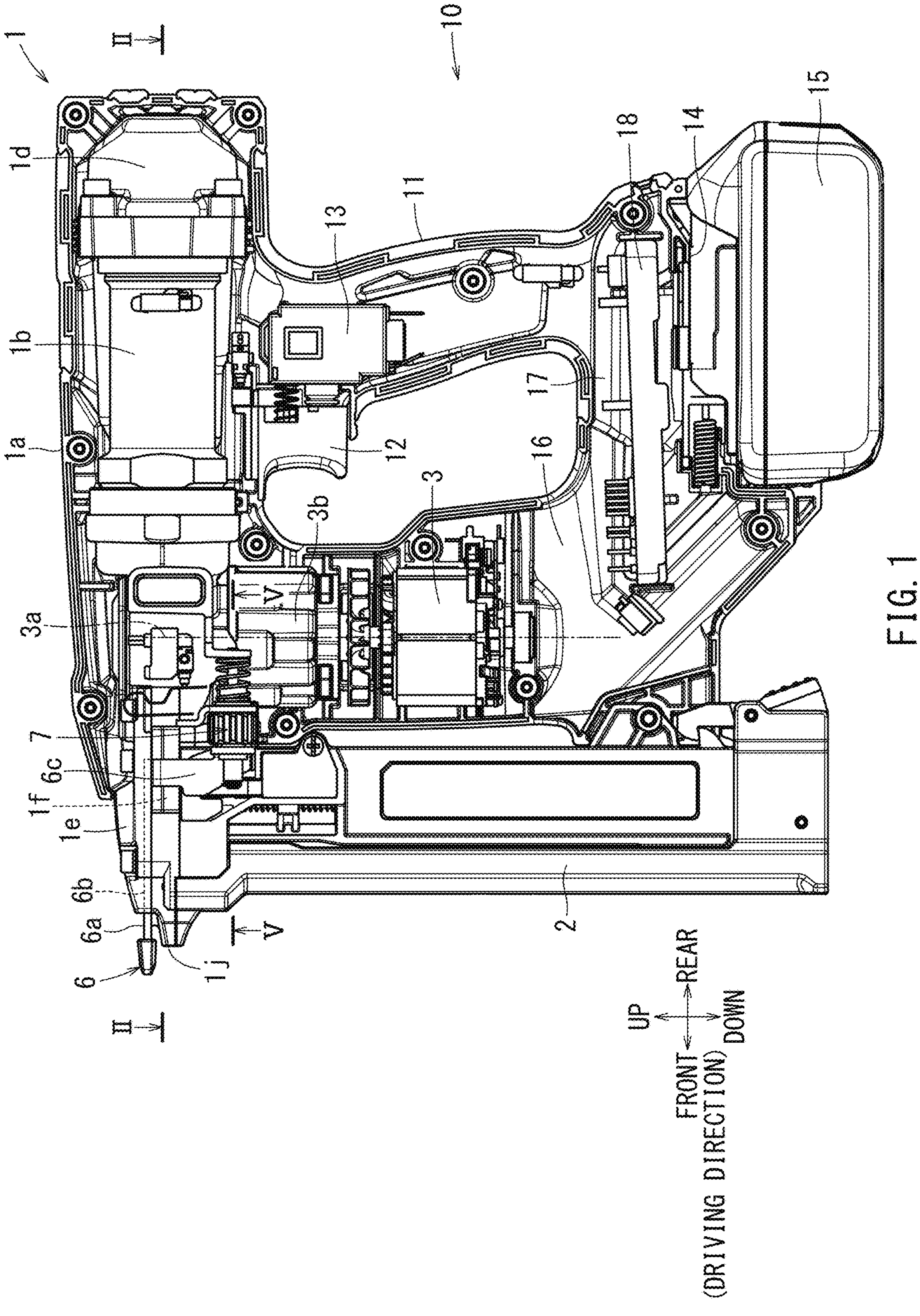
FIG. 1 is a left side view of the driving tool according to a first embodiment of the present disclosure, without a left housing.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another aspect of the present disclosure, the male screw and the female screw have the same fundamental triangle height. Therefore, even if there is a radial clearance, the male screw easily engages the female screw.

According to another aspect of the present disclosure, the adjustment mechanism has a female screw formed in the contact arm and a male screw formed in the connection member. Therefore, the male screw is formed in the rotatable connection member. Accordingly, the male screw can be easily installed onto the rotation shaft of the connection member.

According to another aspect of the present disclosure, an effective diameter of the male screw is smaller than that of the female screw. Therefore, the radial clearance between the male screw and the female screw can be easily obtained.

According to another aspect of the present disclosure, the connection member has a dial that can be rotated by a user. The outer circumferential surface of the dial around its axis is exposed to the outside within 180 degrees or less. Therefore, the user presses and rotates the dial from one direction. Even in such a case, the radial clearance prevents twisting between the male screw and female screw.

According to another aspect of the present disclosure, the connection member has a shaft extending in the front-rear direction. The male screw or female screw is formed in the front portion of the shaft. The rear portion of the shaft is movably supported in the front-rear direction by the main body support portion of the tool main body. The adjustment mechanism screws the rear portion of the contact arm to the front portion of the shaft. Because of this configuration, the contact arm and the shaft can be arranged side by side in the front-rear direction.

According to another aspect of the present disclosure, the main body support portion has a hole through which the rear portion of the shaft is inserted. The center axis of the hole is configured to position closer to the tool main body than the center axis of the shaft. Therefore, when the user pushes the connection member toward the tool main body, the center axis of the hole and the center axis of the shaft are brought closer together. Accordingly, the connection member can be rotated smoothly and easily.

According to another aspect of the present disclosure, the driving tool has a contact portion that contacts the rear portion of the contact arm when the dial is pushed toward the tool main body from the side where the dial is exposed. Therefore, the contact portion supports the rear portion of the contact arm when the connection member is push-operated. Because of this configuration, the contact portion can reduce looseness (rattling) of the adjustment mechanism.

According to another aspect of the present disclosure, when the dial is pushed toward the tool main body from the side where the dial is exposed outside, the rear portion of the contact arm does not contact the tool main body. Even in a case where the configuration of the adjustment mechanism tends to rattle, the radial clearance reduces the twisting between the male screw and the female screw.

According to another aspect of the present disclosure, the rear portion of the contact arm is made of sheet metal, and the female screw is formed as a part of the sheet metal. This allows the female screw to be formed inexpensively as a single component with the rear portion of the contact arm.

Next, a first embodiment of the present disclosure will be described with reference to FIGS. 1 to 6. As shown in FIG. 1, a driving tool 10 is a gas spring type driving tool that uses, for example, gas pressure for driving a driving member. In the following description, a direction of driving the driving member (nail or staple) is defined as a forward direction and a direction opposite to the driving direction is defined as a rearward direction. A user grasps the driving tool 10 with his or her hand and is positioned behind the driving tool 10 (on the rear side in FIG. 1). An up-down direction and a left-right direction are defined based on the user's position.

Figure 2:
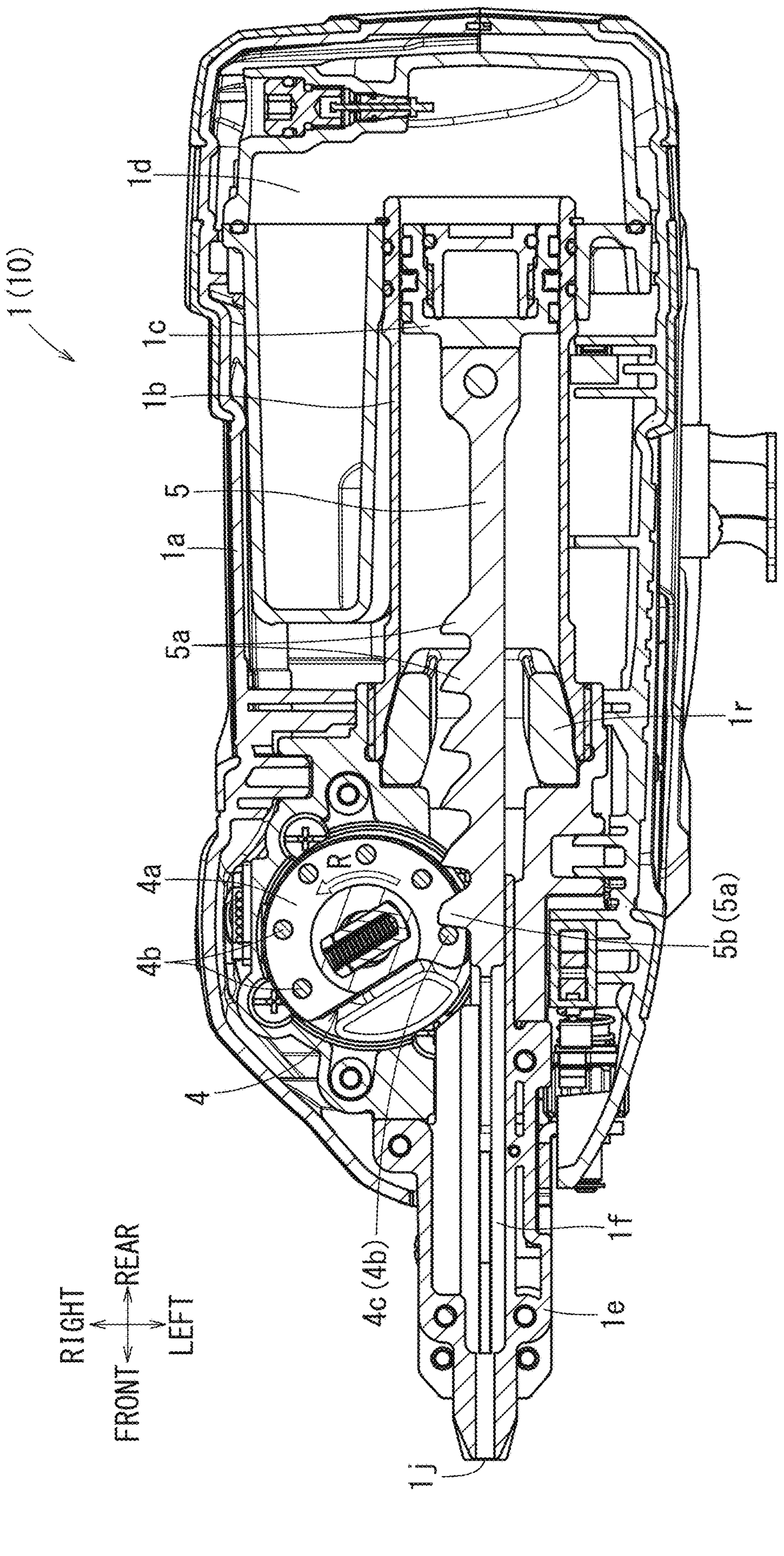
FIG. 2 is a cross-sectional view taken along line II-II of FIG. 1.

As shown in FIG. 1, the driving tool 10 has a tool main body 1 with a tubular housing 1*a*. As shown in FIG. 2, the housing 1*a* encloses a cylindrical cylinder 1*b* that extends in a front-rear direction. Inside the cylinder 1*b* is a piston 1*c* that can move back and forth. The rear portion of the cylinder 1*b*, located behind the piston 1*c*, is connected to an accumulation chamber 1*d*. The accumulation chamber 1*d* is filled with compressed gas, such as air, and the pressure from the gas provides a thrust force that drives the piston 1*c* forward.

As shown in FIG. 1, a driving nose 1*e* is located at the front of housing 1*a*. The driving nose 1*e* contains a driving passage 1*f*, whose rear end connects to the front portion of the cylinder 1*b*. A magazine 2 is attached on the lower side of the driving nose 1*e*. The magazine holds multiple driving members vertically. The driving members are fed one by one from the magazine 2 upward into the driving passage 1*f*.

As shown in FIG. 1, the driving nose 1*e* is provided with a contact arm 6 that is slidably movable in the front-rear direction. The contact arm 6 is biased so as to move in the forward direction relative to the driving nose 1*e* (off position). When pressed against the workpiece, the contact arm 6 moves in the rearward direction relative to the driving nose 1*e* (on position).

As shown in FIG. 1, a grip 11 for the user to hold locates on the lower portion of the tool main body 1. A trigger 12 that the user pulls with his or her finger locates on the upper front surface of the grip 11. A trigger switch 13 inside the grip 11 is switched between an on-off state when the trigger 12 is pulled. However, pulling the trigger 12 is effective only if the contact arm 6 is pressed against a workpiece and is in the "on" position.

As shown in FIG. 1, a battery attachment portion 14 is arranged on a lower surface of the grip 11 extending in the front-rear direction. A battery pack 15 can be removably attached to the battery attachment portion 14. The battery pack 15 can be attached to or detached from the battery attachment portion 14 by sliding the battery pack 15 in the front-rear direction. The battery pack 15 removed from the battery attachment portion 14 can be recharged by a dedicated charger for repeated use. The battery pack 15 can be used as a power source for other power tools. The battery pack 15 operates as a power source for supplying power to an electric motor 3, etc.

As shown in FIG. 1, a driving section case 16, which is formed in approximately a tubular shape, is arranged in front of the grip extending in the up-down direction. An upper portion of the driving section case 16 is integrally connected to the housing 1*a*. A connection section 17 is formed between the driving section case 16 and the battery attachment portion 14. The grip 11, the connection section 17, the driving section case 16 and the housing 1*a* cooperate to form a loop shape. The connection section 17 houses a controller 18. The controller 18 primarily controls driving of the electric motor 3.

As shown in FIG. 1, a motor 3, serving as a driving source, is housed inside the driving section case 16. The electric motor 3 is housed with its motor axis 3*a* extending in the up-down direction. The electric motor 3 is powered from the battery pack 15 and activated by a pulling operation of the trigger 12. A reduction gear train 3*b* is arranged above the electric motor 2. Furthermore, a lift mechanism 4 is arranged above the reduction gear train 3*b*. The electric motor 3, the reduction gear train 3*b*, and the lift mechanism 4 are disposed coaxially with the motor axis 3*a*. A rotational output of electric motor 3 is reduced by the reduction gear train 3*b* and output to the lift mechanism 4 (see FIG. 2).

As shown in FIG. 2, the lift mechanism 4 is positioned on the right side of the driving nose section 1*e*. The lift mechanism 4 has a rotatable wheel 4*a*, which rotates coaxially with the electric motor 3. The wheel 4*a* rotates in a direction indicated by an arrow R (counterclockwise in FIG. 2). The wheel 4*a* is configured to be restricted from rotating in a direction opposite to the direction R. The wheel 2*c* has six engaging portions 4*b* which are arranged along an outer circumferential edge of the wheel 4*a*. The engaging portions 4*b* are cylindrical-shaped shaft members (pins) extending in the up-down direction.

As shown in FIG. 2, an elongated driver 5 extending in the front-rear direction is coupled to a front surface of the piston 1*c*. A tip end of the driver 5 enters the driving passage 1*f*. The driver 5 has six engaged portions 5*a*. Each of the engaging portions 5*a* protrudes rightward from a right side of the driver 5. Each engaged portion 5*a* is formed in the shape of rack teeth. The engaged portions 5*a* are disposed at regular intervals in the longitudinal direction of the driver 5 (in the front-rear direction). Each of the engaging portions 5*a* sequentially engages a corresponding engaging portion 4*b* of the lift mechanism 4.

In FIG. 2, the driver 5 is in its standby position, ready for a driving operation. An engaging portion 4*b* engages a corresponding engaged portion 5*a*. More specifically, the front-end rack 5*b*, which is the foremost engaged portion of the engaged portion 5*a*, engages the rear-end pin 4*c* located at the rear end in the rotation direction of the wheel 4*a*. The last engaging pin 4*c* engages the front-end rack 5*b* from the front. Due to the engagement of the last engaging pin 4*c* with the front-end rack 5*b* and the rotational restriction of the wheel 4*a* in the direction opposite to the direction R, the lift mechanism 4 supports the driver 5 from the front. Accordingly, the driver 5 and the piston 1*c* are held in the standby position against the gas pressure in accumulation chamber 1*d*.

Referring to FIG. 1, when using the driving tool 10, a user grasps the grip 11. The user then presses the contact arm 6 against the workpiece from behind. This causes the contact arm 6 to move rearward relative to the driving nose 1*e*. When the user pulls the trigger 12 while the contact arm 6 is moved rearward relative to the driving nose 1*e*, the controller 18 operates the electric motor 3 to rotate. Rotation of electric motor 3 is thereby transmitted to the lift mechanism 4 via the reduction gear train 3*b*.

As shown in FIG. 2, the wheel 4*a* rotates in the direction indicated by the arrow R. Due to rotation of wheel 4*a*, the last engaging pin 4*c* pushes the front-end rack 5*b* from the front in the rearward direction. Because of this movement, the front-end rack 5*b* disengages from the last engaging pin 4*c*. As a result, the piston 1*c* moves forward due to the gas pressure in the accumulation chamber 1*d*. Accordingly, the tip end of the driver 5 drives a driving member loaded into the driving passage 1*f*.

The driving member driven by the driver 5 is ejected from the ejection port 1*j* located at the front end of the driving nose 1*e*. The ejected driving member is driven into the workpiece. When the piston 1*c* reaches its lower moving end, the piston 1*c* collides with the damper 1*r* to stop moving the piston 1*c* and driver 5 in the forward direction. The damper 1*r* absorbs the impact of the piston 1*c* when the piston 1*c* contacts the damper 1*r*, thereby preventing the piston 1*c* from being damaged.

After the piston 1*c* stops moving forward, the wheel 4*a* continues to rotate in the rotation direction R of the wheel 4*a*. Because of this movement, the engaging portion 4*b* at the leading end in the rotation direction R of the wheel 4*a* engages the rearmost engaged portion 5*a* from the front. As the wheel 4*a* continues to rotate, the engaging portions 4*b* sequentially pushes the corresponding engaged portions 5*a* in the rearward direction. In this manner, the lift mechanism 4 moves the driver 5 and piston 1*c* back to the standby position.

Figure 4:
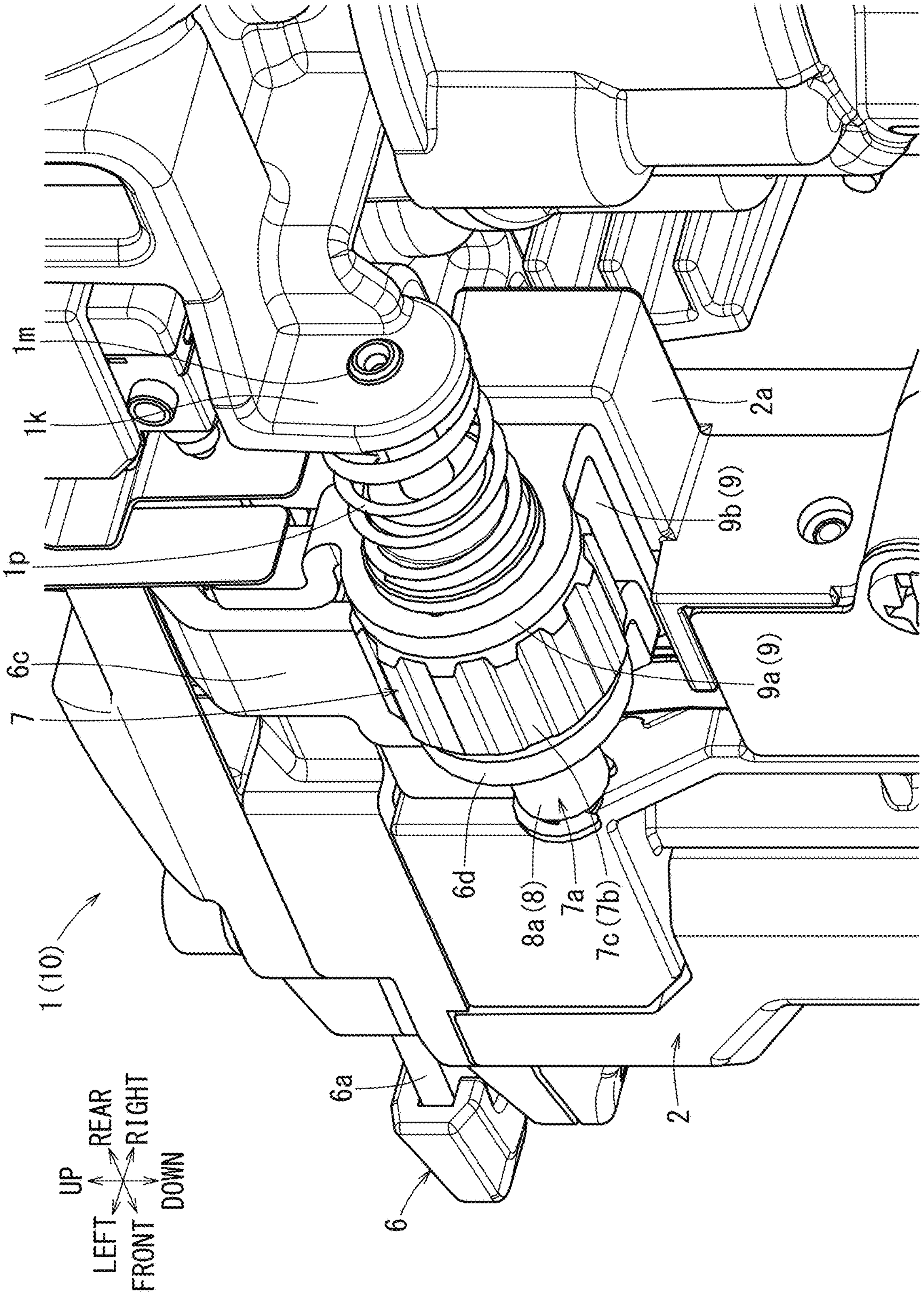
FIG. 4 is a perspective view of the adjustment mechanism viewed from the rear.

As shown in FIG. 1, the contact arm 6 is a long metal member extending in the front-rear direction. The front portion of the contact arm 6*a* is located near the ejection port 1*j*. The middle portion of the contact arm 6*b* extends within the driving nose 1*e* in the front-rear direction. Referring to FIG. 4, the rear portion of the contact arm 6*c* extends from the middle portion of the contact arm 6*b* in the leftward direction and bends downward along the left side of the driving nose 1*e*.

Figure 3:
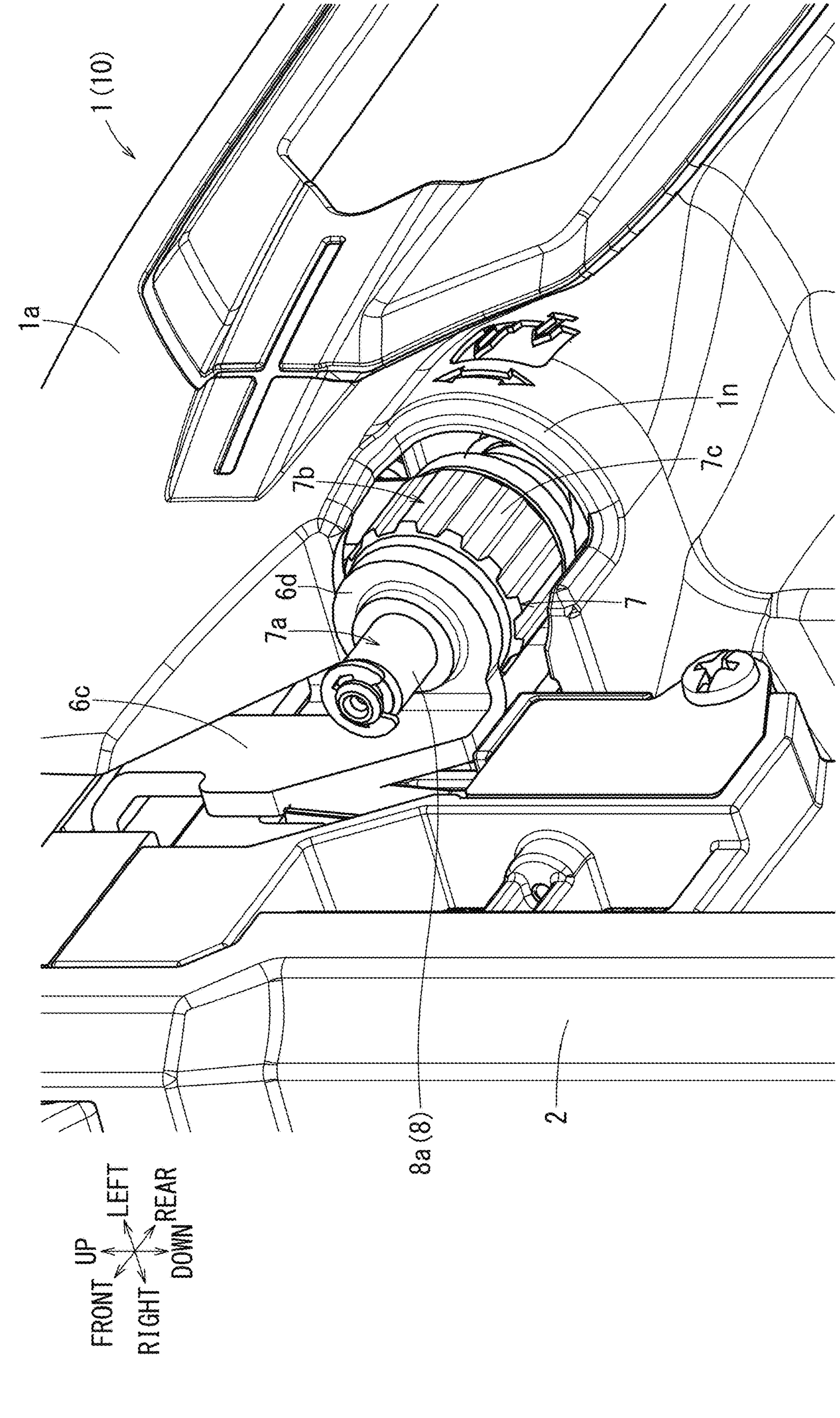
FIG. 3 is a perspective view of an adjustment mechanism viewed from the front.

As shown in FIGS. 3 and 4, the rear portion of the contact arm 6*c* is formed in a thin plate shape. From the lower rear portion of the contact arm 6*c* extending downward, a thin disc-shaped connection portion 6*d* is formed so as to further bend leftward. A shaft 7*a* of a connection member 7 is connected to the disc-shaped connection portion 6*d*. The shaft 7*a* passes through the connection portion 6*d* in the front-rear direction. The shaft 7*a* is a cylindrical member extending in the front-rear direction along the tool main body 1. The rear portion of the shaft 7*a* is inserted into a hole 1*m* formed in the main body support portion 1*k* of the tool main body 1. The shaft 7*a* is supported by the main body support portion 1*k* so as to be rotatable and movable in the front-rear direction relative to the main body support portion 1*k*.

Figure 5:
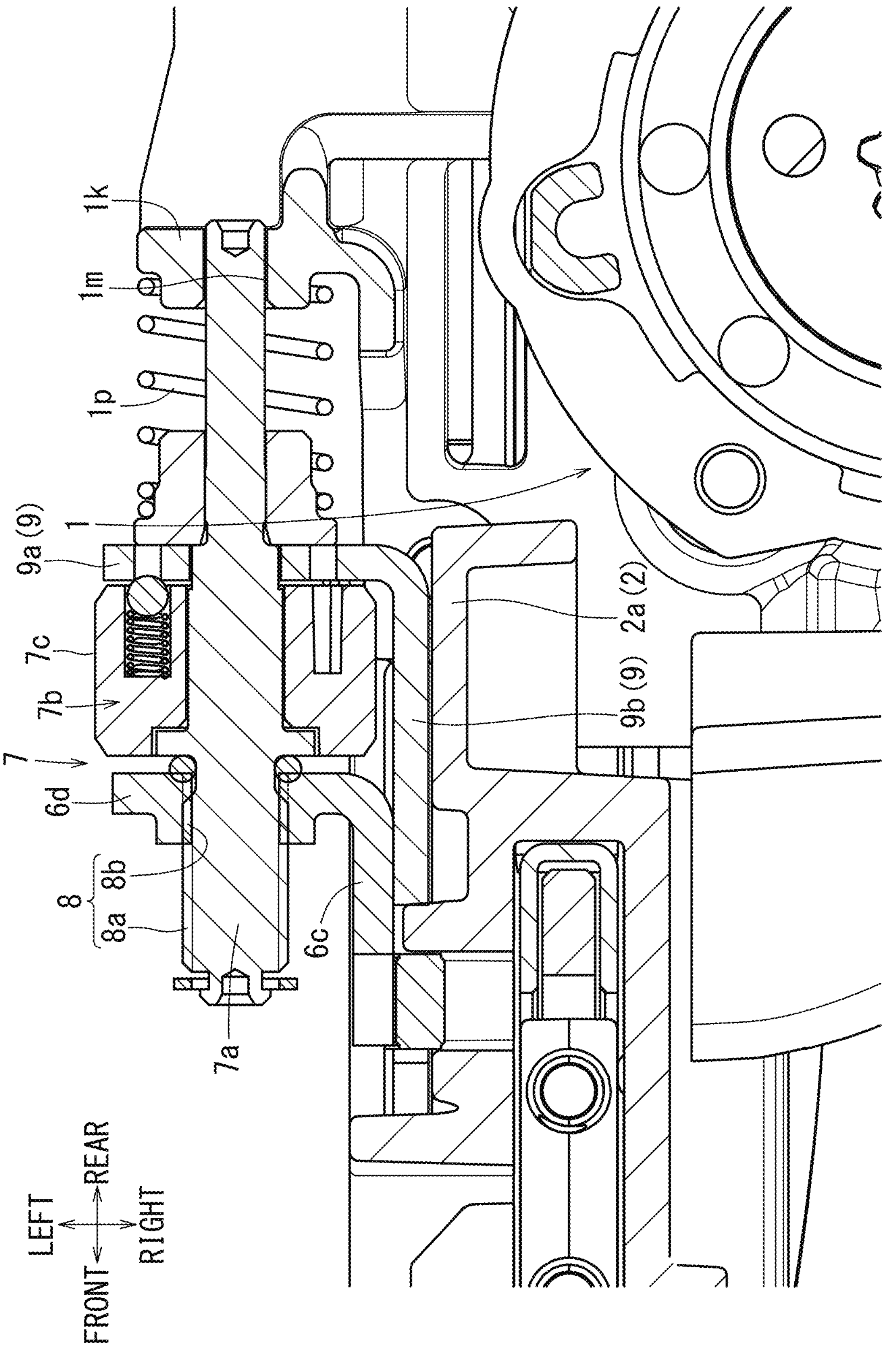
FIG. 5 is a cross-sectional view taken from line V-V of FIG. 1.
Figure 6:
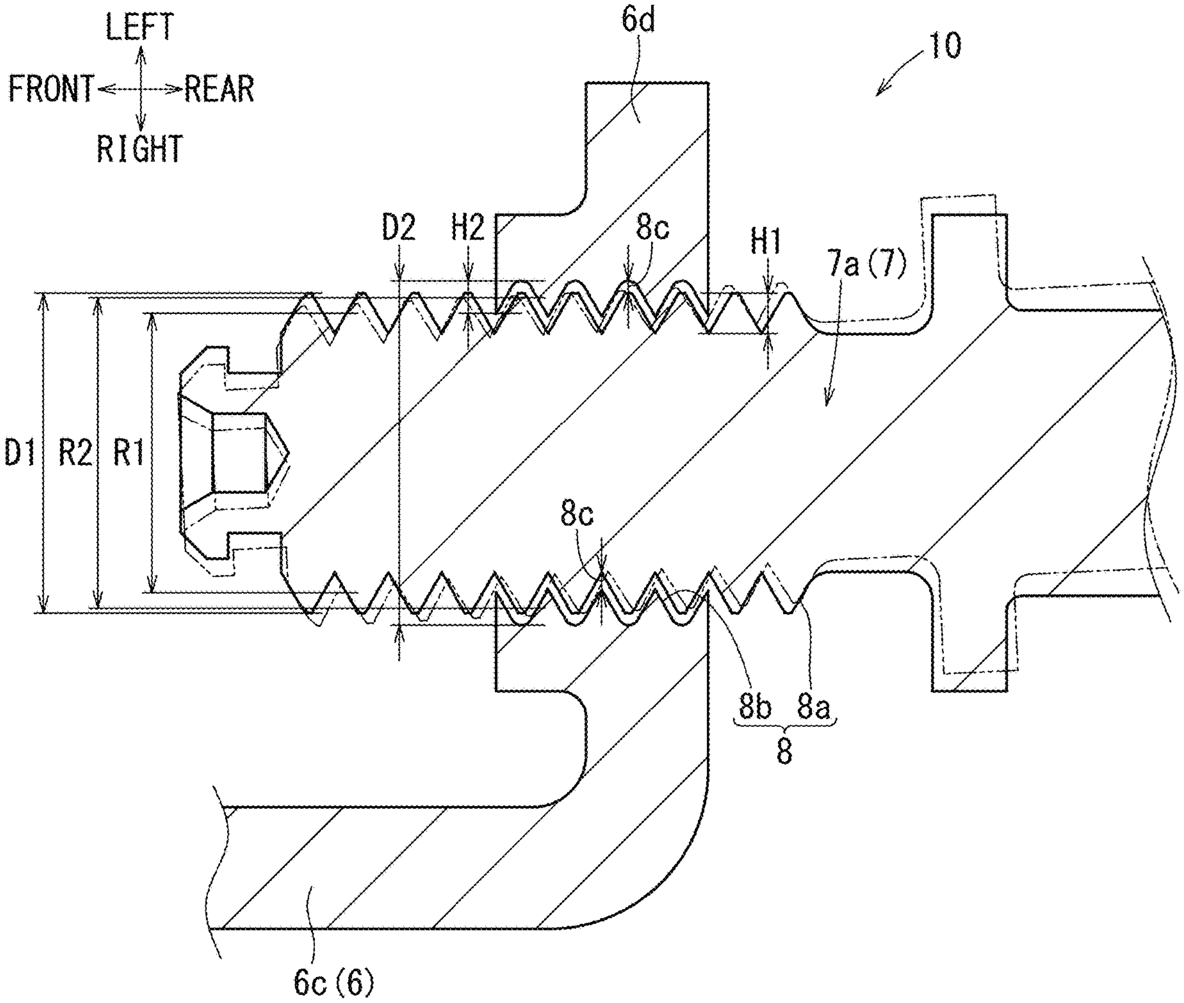
FIG. 6 is an enlarged schematic view of the male and female threads.

As shown in FIGS. 5 and 6, the connection portion 6*d* has a female screw 8*b*, while the front portion of the shaft 71 has a male screw 8*a*. The shaft 7*a* is connected to the connection portion 6*d* so as to screw onto the female screw 8*b*. By rotating the shaft 7*a* around its axis causes the contact arm 6 to move in the front-rear direction relative to the shaft 7*a*, this movement adjusts the position of the contact arm 6 relative to the ejection port 1*j* in the front-rear direction. The position of the contact arm 6 relatively to the ejection port 1*j* in the front-rear direction, which in turns controls the driving depth of the driving member into a workpiece. The above male screw 8*a* and the female screw 8*b* form the adjustment mechanism 8. Each of the above male screw 8*a* and the female screw 8*b* is formed as a metric coarse thread with a nominal diameter of, for example, M6 in the present embodiment.

As shown in FIG. 3, a dial 7*b* is integrally attached to the outer circumference of the shaft 7*a*. The outer circumferential surface of the dial 7*b* has a concave and convex shape. The dial 7*b* is coaxially arranged with the shaft 7*a*. The dial 7*b* rotates together with the shaft 7*a*. The outer circumference of the dial 7*b* is exposed (exposed portion 7*c*) through the window 1*n* in the housing 1*a* toward the outside (refer to the lower left in FIG. 3). The exposed portion 7*c* of the dial 7*b* is exposed in an area less than half of the total circumference. In more detail, for example, the exposed portion 7*c* is exposed in an area of about 160 degrees.

When the user turns the dial 7*b*, the exposed part 7*c* is pushed toward the tool main body 1. As the dial 7*b* rotates, the shaft 7*a* rotates. Thereby, the position of the contact arm 6 relative to the shaft 7*a* in the front-rear direction can be adjusted as described above. As shown in FIG. 5, the shaft 7*a* is moved rightward by the user's force pressing the dial 7*b*. In more detail, a front portion of the shaft 7*a* is moved rightward, closer to the tool main body 1, using the junction with the main body support portion 1*k* as a fulcrum.

Accordingly, when the user rotates the dial 7b, the male screw 8a becomes inclined relative to the female screw 8b, as shown in an imaginary line in FIG. 6. In the present embodiment, a radial clearance 8c is formed between the male screw 8a and the female screw 8b over the entire length of the shaft 7a. This radial clearance 8c can absorb the inclination of the male screw 8a. In other words, even if the male screw 8a is inclined, it is less likely to significantly interfere with the female screw 8b. Therefore, the male screw (threads) 8a and the female screw (threads) 8b are less likely to be twisted, allowing the male screw 8a to rotate smoothly without getting stuck on the female screw 8b. Accordingly, the user can rotate the dial 7b with ease and good operability.

Referring to FIG. 6, a radial clearance 8c is formed by setting the crest diameter (major diameter) D1 of the male screw 8a smaller than the nominal diameter M6 of the male screw 8a. In more detail, the crest diameter D1 is set within a range of 90% to 96% of the nominal diameter M6 (i.e., 6 mm diameter). More preferably, the crest diameter D1 is set within a range of 94% to 96% of the nominal diameter M6. In this embodiment, for example, D1 is set to be about 5.7 mm, which corresponds to about 95% of the nominal diameter M6.

Regarding the female screw 8b, the root diameter (minor diameter) D2 of the female screw 8b is equal to the nominal diameter M6 of the female screw 8b. The radial clearance 8c is defined as the difference between the root diameter D2 and the crest diameter D1. Therefore, the radial clearance 8c is formed to be within a range of 4% to 10%, preferably 4% to 6%, of the root diameter D2 of the female screw 8b. The size of the radial clearance 8c is adjusted to be smaller than the fundamental triangle height H1 of the male screw 8a. Because of this configuration, even with the radial clearance 8c, the male screw 8a and female screw 8b do not become completely disengaged, and the male screw 8a and female screw 8b can be properly screwed together.

As described above, by reducing the crest diameter D1 of the male screw 8a, an effective diameter (pitch diameter) R1 of the male screw 8a becomes smaller than an effective diameter R2 of the female screw 8b. The dimensions, angles, and pitch of the threads of the male screw 8a are the same as those of a metric coarse thread with the nominal diameter of M6. Therefore, the fundamental triangle height H1 of the male screw 8a and the fundamental triangle height H2 of the female screw 8b are the same size.

In the present embodiment, an engagement length (engagement margin) of one thread of the male screw 8a with respect to the female screw 8b ranges from 3.5% to 5.6% for a nominal diameter of M6. A standard engagement length of a male screw is set about 7% for a nominal diameter of M6, and thus the engagement length (ranging from 3.5% to 5.6%) of the male screw 8a is designed to be 50% to 80% of that of a standard M6 screw. More preferably, the engagement length is set in a range of 70 to 80% of that of the standard M6 screw. In the present embodiment, the engagement length of the male screw 8a is set to be about 0.31 mm. This value is about 5.2% of the nominal diameter of M6, and about 74% of the engagement length of the standard M6 screw.

The rear portion 6c of the contact arm 6 and the connection portion 6d are formed by bending a sheet metal. The female screw 8b is formed as a single member with the rear portion 6c and the connection portion 6d. Therefore, the female screw 8b is generally designed to allow for large variation in both positional and tilt accuracy relative to the male screw 8a. For this reason, the male screw 8a may be screwed in an inclined state with respect to the female screw 8b even in its natural state. However, even in such a configuration, the male screw 8a is less likely to interfere with the female screw 8b by making the effective diameter R1 of the male screw 8a smaller than the effective diameter R2 of the female screw 8b. Because of this, the male screw 8a and the female screw 8b are less likely to be twisted (Twisting between the male screw 8a and the female screw 8b can be effectively reduced.)

As shown in FIG. 4, a bracket 9 is disposed behind the dial 7b. The bracket 9 has a dial supporting portion 9a that supports the rear surface of the dial 7b over its entire circumference. A compression spring 1p is disposed between the dial supporting portion 9a and the main body support portion 1k. The compression spring 1p biases the dial supporting portion 9a of the bracket 9 in the forward direction. Therefore, the shaft 7a is biased in the forward direction together with the dial 7b. Accordingly, the contact arm 6 is biased in the forward direction relative to the driving nose 1e.

As shown in FIGS. 4 and 5, the bracket 9 has an arm supporting portion 9b that protrudes rightward from the dial supporting portion 9a and then bends forward. The arm supporting portion 9b supports the rear portion 6c of the contact arm 6 from the right. The arm supporting portion 9b is supported from the right by the contact portion 2a formed in the magazine 2. Because of this configuration, the rear portion 6c of the contact arm 6 is supported from the right by the contact portion 2a of the magazine 2 via the arm supporting portion 9b. Therefore, when the user presses the exposed portion 7c of the dial 7b, it is relatively difficult to move the rear portion 6c of the contact arm 6 to the right (toward the tool main body 1). This makes it easier to prevent twisting between the male screw 8a and female screw 8b.

As shown in FIGS. 3 and 6, the driving tool 10 has a contact arm 6 that protrudes forward from the ejection port 1j. The rear portion 6c of the contact arm 6 attaches to a connection member 7 via an adjustment mechanism 8 to screw (secure) the rear portion 6c to the connection member 7. The adjustment mechanism 8 allows the user to rotate the connection member 7 to change the position of the contact arm 6 in the front-rear direction. The adjustment mechanism 8 has a male screw 8a, a female screw 8b, and a radial clearance 8c formed between the male screw 8a and the female screw 8b. The male screw 8a is on either the contact arm 6 or the connection member 7, while the female screw 8b is on the other of the two members. The radial clearance 8c is defined as a difference between the crest diameter D1 of the male screw 8a and the root diameter D2 of the female screw 8b. Its size is between 4% and 10% of the root diameter D2. The crest diameter D1 is the length of the diameter that connects the crests of the male screw (threads) 8a in the radial direction. The root diameter D2 is the length of the diameter that connects the bottoms of the valleys of the female screw (threads) 8b in the radial direction. Therefore, the radial clearance 8c allows the adjustment mechanism 8 to slightly rattle. This configuration prevents the screws, i.e. the male screw (threads) 8a and the female screw (threads), from twisting or binding, even if the male screw 8a and the female screw 8b are misaligned or tilted due to, for example, the tilting of the connection member 7. This reduces a risk of the connection member 7 becoming difficult to turn, ensuring the adjustment mechanism remain easy to operate.

As shown in FIG. 6, the male screw 8a and the female screw 8b have the same fundamental triangle heights H1 and H2. Therefore, even if there is a radial clearance 8*c*, the male screw 8*a* easily engages the female screw 8*b*.

As shown in FIG. 6, the adjustment mechanism 8 has a female screw 8*b* formed in the contact arm 6 and a male screw 8*a* formed in the connection member 7. Therefore, the male screw 8*a* is formed on the rotatable connection member 7. Accordingly, the male screw 8*a* can be easily installed onto the rotation shaft of the connection member 7.

As shown in FIG. 6, the effective diameter R1 of the male screw 8*a* is smaller than the effective diameter R2 of the female screw 8*b*. Therefore, the radial clearance 8*c* between the male screw 8*a* and the female screw 8*b* can be easily obtained.

As shown in FIG. 3, the connection member 7 has a dial 7*b* that can be rotated by the user. The outer circumferential surface of the dial 7*b* around its axis is exposed to the outside within 180 degrees or less. Therefore, the user presses and rotates the dial 7*b* from one direction. Even in such a case, the radial clearance 8*c* prevents twisting between the male screw 8*a* and female screw 8*b*.

As shown in FIGS. 3 and 4, the connection member 7 has a shaft 7*a* extending in the front-rear direction. The male screw 8*a* or female screw 8*b* is formed in the front portion of the shaft 7*a*. The rear portion of the shaft 7*a* is movably supported in the front-rear direction by the main body support portion 1*k* of the tool main body 1. The adjustment mechanism 8 screws the rear portion 6*c* of the contact arm 6 to the front portion of the shaft 7*a*. Because of this configuration, the contact arm 6 and the shaft 7*a* can be arranged side by side in the front-rear direction.

As shown in FIG. 5, the driving tool 10 has a contact portion 2*a* that contacts the rear portion 6*c* of the contact arm 6 when the dial 7*b* is pushed toward the tool main body 1 from the side where the dial 7*b* is exposed. Therefore, the contact portion 2*a* supports the rear portion 6*c* of the contact arm 6 when the connection member 7 is push-operated. Because of this configuration, the contact portion 2*a* can reduce looseness (rattling) of the adjustment mechanism 8.

As shown in FIG. 3, the rear portion 6*c* of the contact arm 6 is made of sheet metal, and the female screw 8*b* is formed as a part of the sheet metal. This allows the female screw 8*b* to be formed inexpensively as a single component with the rear portion of the contact arm 6*c*.

Next, the second embodiment of the present disclosure will be explained with reference to FIGS. 7 and 8. A driving tool 20 of the second embodiment has a main body support portion 21 instead of the main body support portion 1*k* in FIG. 4. Descriptions of the members and configurations in common with the first embodiment are omitted by using the same reference numerals, and only the components that differ from the first embodiment will be described in detail.

Figure 7:
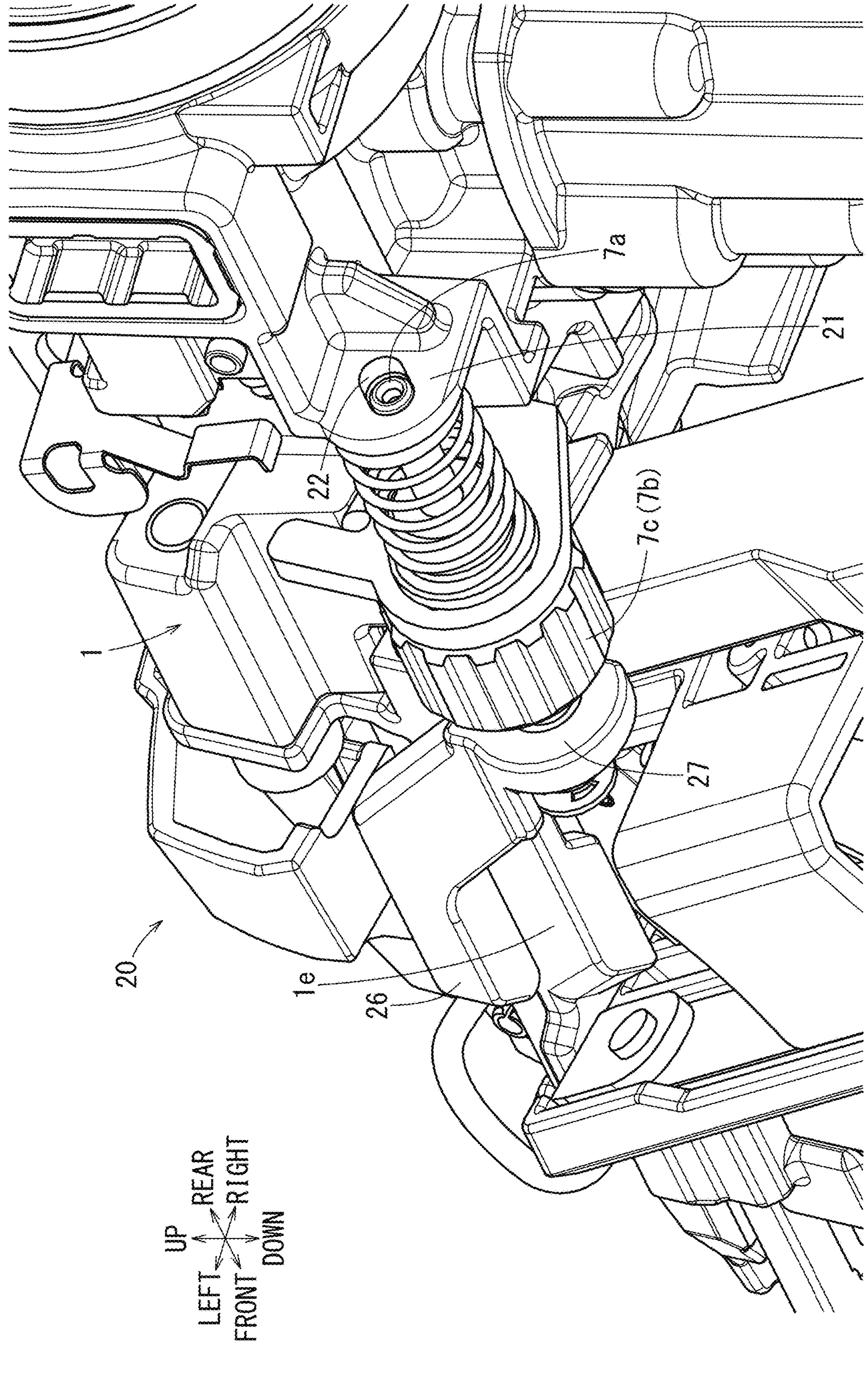
FIG. 7 is a perspective view of an adjustment mechanism according to a second embodiment of the present disclosure, viewed from the rear.
Figure 8:
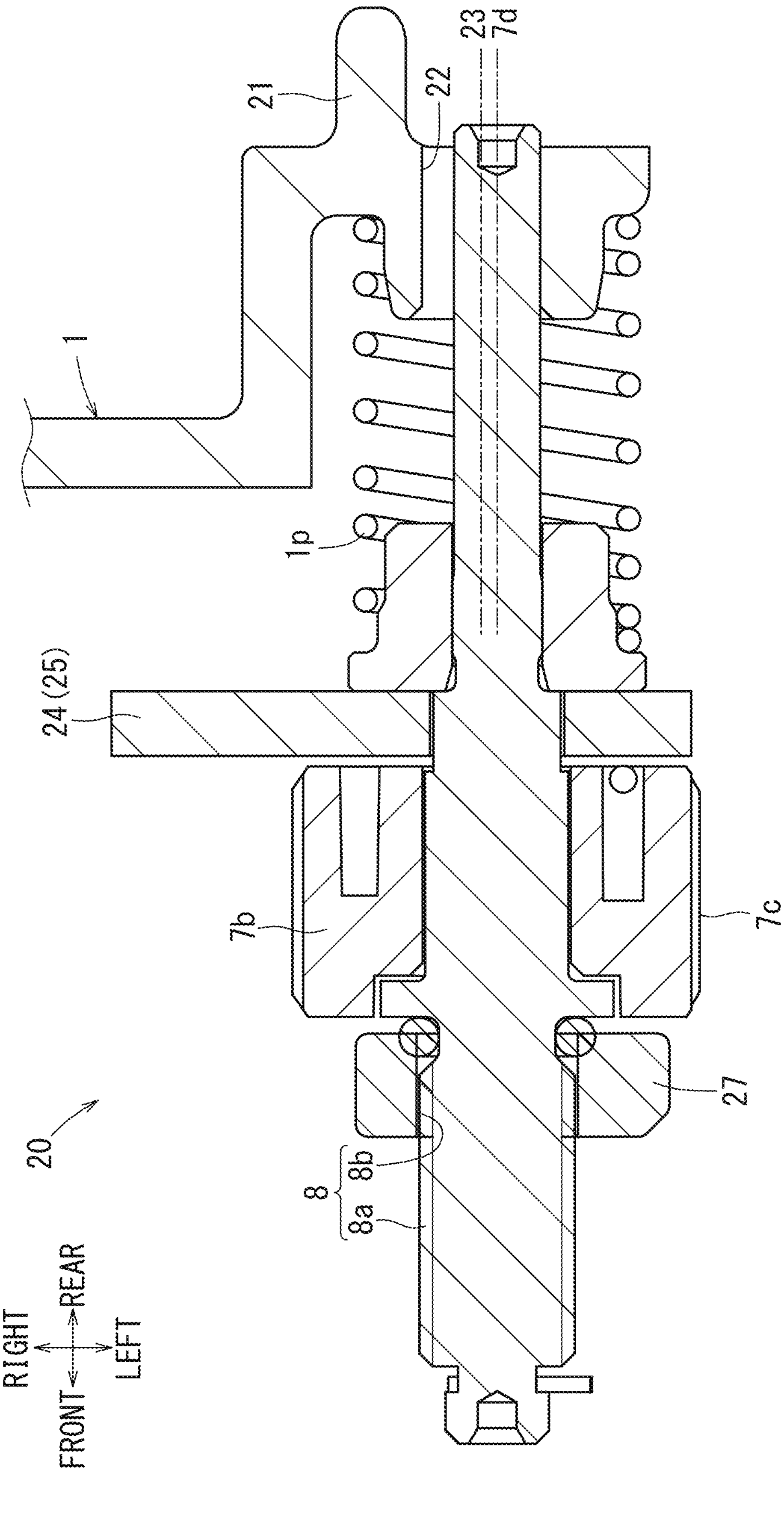
FIG. 8 is a cross-sectional view of a connection portion, which is viewed from above.
Figure 9:
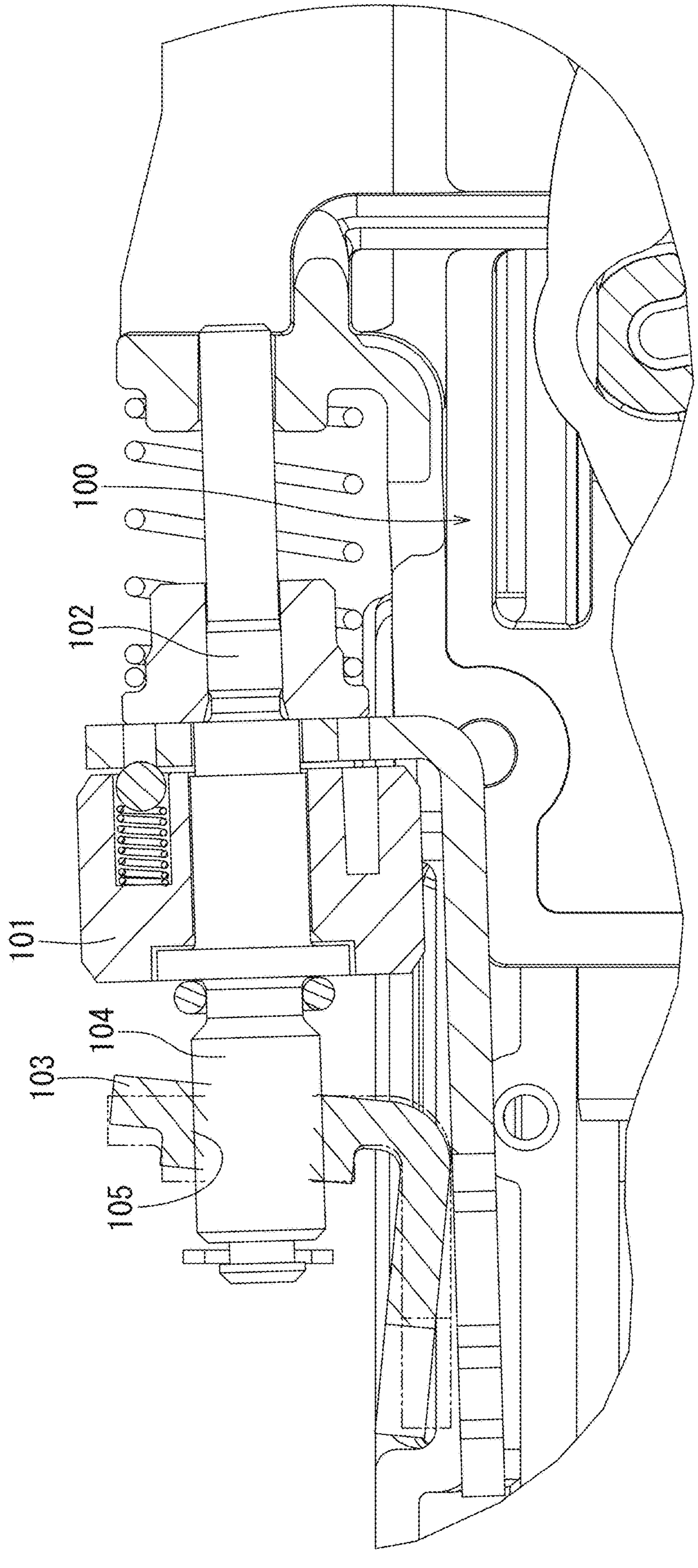
FIG. 9 is a cross-sectional view corresponding to FIG. 5, illustrating the conventional adjustment mechanism.

FIGS. 7 and 8 illustrate a positional relationship between the rear part of the shaft 7*a* and the main body support portion 21. As shown in FIG. 7, the main body support portion 21 has a hole 22 that the rear part of the shaft 7*a* passes through. The shaft 7*a* is intentionally assembled such that the shaft 7*a* is displaced in a lower left direction relative to the center of the hole 22. FIG. 8 shows a cross-sectional view of the shaft 7*a* and the main body support portion 21 from above. In the natural state, the center axis 23 of the hole 22 is positioned to the right (toward the tool main body 1).

The shaft 7*a* is assembled so as to be pressed against a left inner surface of the hole 22. When the user pushes the dial 7*b* toward the tool main body 1, the center axis 7*d* of the shaft 7*a* moves closer to the center axis 23 of the hole 22. This makes it easier for the user to rotate the shaft 7*a* with respect to the main body supporting portion 21 when the user pushes and turns the dial 7*b*. Accordingly, the operability of the dial 7*b* can be improved.

In FIG. 7, the contact arm 6's rear portion 26 extends forward from the connection portion 27 along the left side of the driving nose 1*e* in a "floating" state. The rear portion 26 of the contact arm 6 is supported by the driving nose 1*e* at its forwardly extending end. Because of this configuration, the connection portion 27 is positioned relatively far from where the driving nose 1*e* provides support. Furthermore, as shown in FIG. 8, the bracket 24 lacks an arm supporting portion 9*b* that protrudes from the dial supporting portion 25. Therefore, the driving tool 20 has no right-side support for the connection portion 27. As a result, the connection portion 27 does not contact the tool main body 1 even when the user pushes the dial 7*b* toward the upper right.

Accordingly, when the user presses the dial 7*b*, the connection portion 27 tends to be shifted toward the tool main body 1. Even in such a configuration, the radial clearance 8*c* between the male and female screws 8*a* and 8*b* can properly absorb the mutual misalignment of the male and female screws 8*a* and 8*b* (refer to FIG. 6). Accordingly, the male screw 8*a* and the female screw 8*b* are less likely to twist, and the dial 7*b* can be rotated smoothly and easily.

As described above, FIGS. 7 and 8, the main body support portion 21 has a hole 22 through which the rear portion of the shaft 7*a* is inserted. The center axis 23 of the hole 22 is configured to position closer to the tool main body 1 than the center axis 7*d* of the shaft 7*a*. Therefore, when the user pushes the connection member 7 toward the tool main body 1, the center axis 23 of the hole 22 and the center axis 7*d* of the shaft 7*a* are brought closer together. Accordingly, the connection member 7 can be rotated smoothly and easily.

As shown in FIG. 8, when the dial 7*b* is pushed toward the tool main body 1 from the side where the dial 7*b* is exposed outside, the rear portion 26 of the contact arm 6 does not contact the tool main body 1. Even in a case where the configuration of the adjustment mechanism 8 tends to rattle, the radial clearance 8*c* reduces the twisting between the male screw 8*a* and the female screw 8*b*.

Various modifications can be made to each of the embodiments described above. In the above embodiments, the driving tool is a gas spring type driving tool. Instead, the present disclosure may be applied to a driving tool that is referred to as a mechanical spring type, in which, for example, the driver is moved in the opposite direction of the driving direction by a lift mechanism to increase a spring force such as a mechanical compression spring or the like, for moving the driver in the driving direction. In addition, the present disclosure can be applied to a flywheel type driving tool, a compressed air type driving tool with a compressor connection, etc., regardless of the driving methods.

In the present disclosure, the crest diameter of the male screw is formed smaller in the radial direction than the nominal diameter of the male screw, thereby making the effective diameter of the male screw smaller than the effective diameter of the female screw. Instead, the effective diameter of the female screw can be made smaller than the effective diameter of the male screw by forming the root diameter of the female screw larger in the radial direction than the nominal diameter of the female screw. Furthermore, the male screw may be formed in the contact arm and the female screw may be formed in the connection member. Furthermore, the male screw's fundamental triangle height may be different from the female screw's fundamental triangle height. The male and female screws are not limited to a nominal diameter of M6, and they can be of any thickness as long as the nominal diameter is M12 or smaller.

The rear portion of the contact arm and connection member may be located on the left side, the right side, the upper side, or any other location of the tool main body. The contact portion that supports the rear portion of the contact arm may be arranged in the tool main body instead of in the magazine.

We claim:

1. A driving tool comprising:
- a tool main body;
- a contact arm that protrudes forward from an ejection port;
- a connection member connected to a rear portion of the contact arm; and
- an adjustment mechanism configured to adjust a position of the contact arm in a front-rear direction by screwing the connection member to a rear portion of the contact arm, wherein,
- the adjustment mechanism includes a male screw, a female screw, and a radial clearance formed between the male screw and the female screw, the male screw being formed on either the contact arm or the connection member while the female screw is formed on another one of the contact arm and the connection member, and
- the radial clearance being a difference between a crest diameter of the male screw and a root diameter of the female screw, the radial clearance's size is between 4% and 10% of the root diameter of the female screw.

2. The driving tool according to claim 1, wherein the male screw and the female screw have a same fundamental triangle height.

3. The driving tool according to claim 1, wherein the female screw is formed in the contact arm and the male screw is formed in the connection member.

4. The driving tool according to claim 3, wherein the rear portion of the contact arm is made of sheet metal and the female screw is formed as a part of the sheet metal.

5. The driving tool according to claim 1, wherein an effective diameter of the male screw is smaller than that of the female screw.

6. The driving tool according to claim 1, wherein,
- the connection member includes a dial that is rotatable by a user, and
- an outer circumferential surface of the dial is exposed to an outside within an area of 180 degrees or less.

7. The driving tool according to claim 6, further comprising a contact portion that contacts the rear portion of the contact arm when the dial is pushed toward the tool main body from a side where the dial is exposed.

8. The driving tool according to claim 6, wherein the tool main body is configured such that when the dial is pushed toward the tool main body from a side where the dial is exposed, the rear portion of the contact arm is prevented from contacting the tool main body.

9. The driving tool according to claim 1, wherein,
- the connection member includes a shaft extending in the front-rear direction,
- the male screw or the female screw is formed on a front portion of the shaft, and
- a rear portion of the shaft is movably supported in the front-rear direction by a main body support portion of the tool main body.

10. The driving tool according to claim 9, wherein,
- the main body support portion includes a hole through which the rear portion of the shaft is inserted, and
- a center axis of the hole is positioned closer to the tool main body than a center axis of the shaft.

11. A driving tool comprising:
- a tool main body;
- a contact arm including a front portion that protrudes forward from an ejection port and a rear portion that protrudes rearward, the contact am configured to move in a front-rear direction relative to the tool main body;
- a connection member with a shaft, the connection member configured to be connected to the rear portion of the contact arm and to be rotatable relative to the tool main body;
- an adjustment mechanism configured to adjust a position of the contact arm in the front-rear direction by screwing a front portion of the connection member to the rear portion of the contact arm, wherein,
- a rear portion of the shaft of the connection member is biased forward and movably supported in the front-rear direction by a main body support portion of the tool main body,
- the adjustment mechanism includes a female screw that is formed on the rear portion of the contact arm and a male screw that is formed on a front portion of the shaft of the connection member and has a same nominal diameter as the female screw, and
- a crest diameter of the male screw is 90% to 96% of the nominal diameter.

12. The driving tool according to claim 11, wherein the crest diameter of the male screw is preferably 94% to 96% of the nominal diameter.

13. The driving tool according to claim 11, wherein the male screw and the female screw have a same fundamental triangle height.

14. The driving tool according to claim 11, wherein the connection member further includes a dial that is rotatable together with the shaft.

15. The driving tool according to claim 14, wherein an outer circumferential surface of the dial is exposed to an outside within an area of 180 degrees or less.

16. The driving tool according to claim 15, further comprising a contact portion that contacts the rear portion of the contact arm when the dial is pushed toward the tool main body from an exposed side.

17. The driving tool according to claim 15, wherein the tool main body is configured such that when the dial is pushed toward the tool main body from an exposed side, the rear portion of the contact arm is away from the tool main body.

18. The driving tool according to claim 11, wherein,
- the main support portion has a hole through which the rear portion of the shaft is inserted through, and
- a center axis of the hole is positioned closer to the tool main body than a center axis of the shaft.

19. The driving tool according to claim 11, wherein the rear portion of the contact arm is made of sheet metal and the female screw is formed as a part of the sheet metal.

20. The driving tool according to claim 11, wherein the male screw and the female screw are formed with metric coarse threads having a nominal diameter of M12 or less.

* * * * *